United States Patent [19]

Tanaka et al.

[11] Patent Number: 5,067,593
[45] Date of Patent: Nov. 26, 1991

[54] BRAKING DEVICE FOR ELEVATOR WINDING MACHINE AND ELEVATOR USING THE BRAKING DEVICE

[75] Inventors: Masakatsu Tanaka; Masanobu Itoh; Noboru Arabori; Toshihiko Nara, all of Katsuta; Tastuhiko Takahashi, Ibaraki; Katutaro Masuda; Mitsuo Saito, both of Katsuta, all of Japan

[73] Assignee: Hitachi, Ltd., Tokyo, Japan

[21] Appl. No.: 438,014

[22] Filed: Nov. 20, 1989

[30] Foreign Application Priority Data

Dec. 7, 1988 [JP] Japan ................................. 63-307843

[51] Int. Cl.$^5$ ............................................. B66B 5/08
[52] U.S. Cl. ..................................... 187/73; 188/71.1; 188/171; 192/1.55
[58] Field of Search ..................... 187/28.17, 32.23, 35, 187/27, 73, 89, 108, 115; 188/18 A, 71.1, 73.31, 73.46, 171; 192/1.55, 1.52, 1.53, 1.2, 1.22; 254/378

[56] References Cited

U.S. PATENT DOCUMENTS

| | | | |
|---|---|---|---|
| 3,605,958 | 9/1971 | McCarthy | 188/171 |
| 4,476,965 | 10/1984 | Brown, Jr. et al. | 188/171 |
| 4,739,969 | 4/1988 | Eckersley et al. | 188/171 X |
| 4,875,558 | 10/1989 | Berkham et al. | 188/171 |

Primary Examiner—Robert P. Olszewski
Assistant Examiner—Dean A. Reichard
Attorney, Agent, or Firm—Antonelli, Terry, Stout & Kraus

[57] ABSTRACT

A braking device for an elevator winding machine generates a braking force by contacting a rotary body driven by a rotary shaft of the winding machine with a brake section supported through the intermediary of an elastic body. The elastic body has a nonlinear elastic characteristic so that a starting shock to the passengers in the elevator car is prevented and the braking torque detecting accuracy is improved.

23 Claims, 8 Drawing Sheets

BRAKING DEVICE FOR ELEVATOR WINDING MACHINE AND ELEVATOR USING THE BRAKING DEVICE

BACKGROUND OF THE INVENTION AND RELATED ART STATEMENT

This invention relates to a braking device for an elevator winding machine and an elevator using the braking device. More particularly, the invention relates to a braking device for an elevator winding machine, wherein a brake section is elasticilly supported in the rotating direction, and to an elevator using the braking device.

In an elevator, a car or cage and a balance weight are generally suspended from a sheave of a motor-driven winding machine through a rope or cable, to one end of which the car is attached and to another end of which the balance weight is attached. While the elevator is not being moved, the braking device is actuated and an unbalance torque generated by a difference in weight between the car and the balance weight is absorbed by the braking device. If, under this condition, the braking device is released and the elevator is operated, the unbalance torque, generates a starting shock.

In order to decrease the starting shock when the elevator is started, in a conventionally-practiced method, the motor generates at first a torque (starting compensation torque) corresponding to the braking torque (unbalance torque) which has been generated by the braking device, and subsequently the braking device is released.

To perform the starting compensation as mentioned above, it is necessary to detect the braking torque corresponding to the unbalance torque when the elevator car is not being moved.

In the conventional method for detecting the braking torque, the brake section, of the braking device is supported through the intermediary of an elastic body and a displacement of the brake section in its rotating direction is detected. (Japanese Patent Unexamined Publication No. 57-1180).

In the braking device for an elevator winding machine, which has a construction as described above, if a spring constant of the elastic body is small to improve the braking torque detecting accuracy, the elastic body is greatly deformed by a very small braking torque so that the brake section rotates by a predetermined angle.

However, when the elevator car receives many passengers almost to its riding capacity and a large braking torque is needed, the elastic body is deformed greatly so that the brake section collides against a stopper, and a shock generated at this time terrifies the passengers in the car.

On the other hand if the spring constant of the elastic body is large in order to prevent the brake section from colliding against the stopper, the detecting accuracy of the braking torque is lowered so that the starting compensation can not be executed adequately.

OBJECT AND SUMMARY OF THE INVENTION

An object of this invention is to provide a braking device for an elevator winding machine, which does not give a shock to the passengers in the elevator car and which can improve the braking torque detecting accuracy.

Another object of this invention is to provide a braking device for an elevator winding machine, which ensures high reliability.

According to the present invention, in a braking device of a winding machine for elevators, the brake section engages with or disengages from a rotary body connected to a rotary shaft of the winding machine, so that the braking force for the elevator is generated or not generated, the brake section is supported on a fixed member through the intermediary of at least one elastic body having a nonlinear characteristic, including a first range with a small spring constant and a second range with a large spring constant, and displacement detecting means detects the rotational displacement of the brake section generated by the unbalance torque in the first range of the elastic body when the winding machine is stopped.

Furthermore, according to a modification of the present invention, the displacement detecting means detects the rotational displacement of the brake section generated by the torque in the first and second ranges of the elastic body when the winding machine is in operation.

Since the spring constant of the first range is small, the elastic body is greatly deformed by a very small braking torque in the first range. This ensures a high accuracy in detecting the braking torque. Since the spring constant of the second range is large, the deformation of the elastic body does not increase rapidly in braking so that the brake section, is prevented from colliding against the stopper even if many passengers get on the elevator car to load it almost to its capacity and an increased braking torque is needed.

While the winding machine is operating, the elastic body is generally deformed in the first range. But, a torque greater than the torque of the normal operating condition is generated in an abnormal operating condition. In such a case, the elastic body is deformed in the second range. This abnormality can be detected by displacement detecting means which detects the displacement of the brake section in the first and second ranges of the elastic body.

DETAILED DESCRIPTION OF PREFERRED EMBODIMENTS

Figure 1:
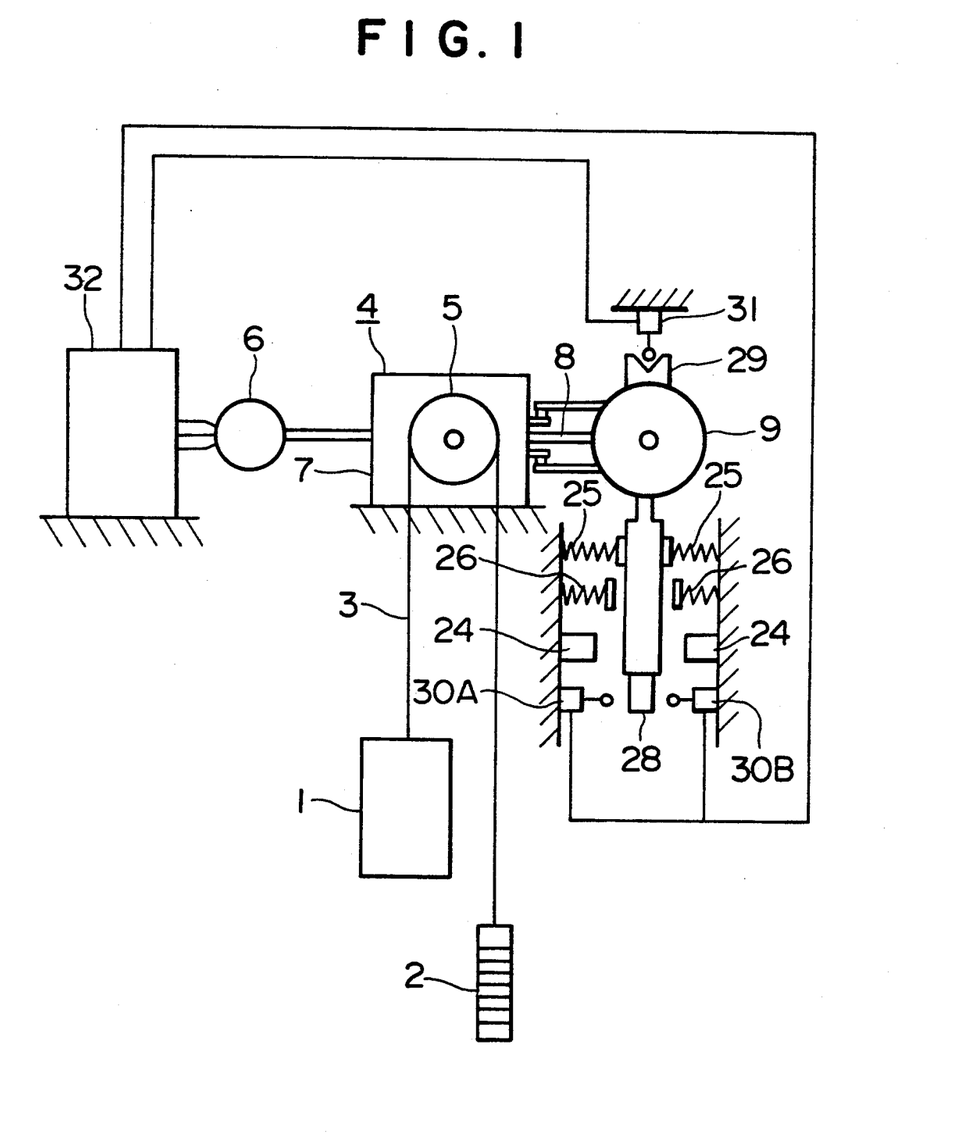
FIG. 1 is a schematic diagram of a braking device of a winding machine for elevators according to the present invention.
Figure 2:
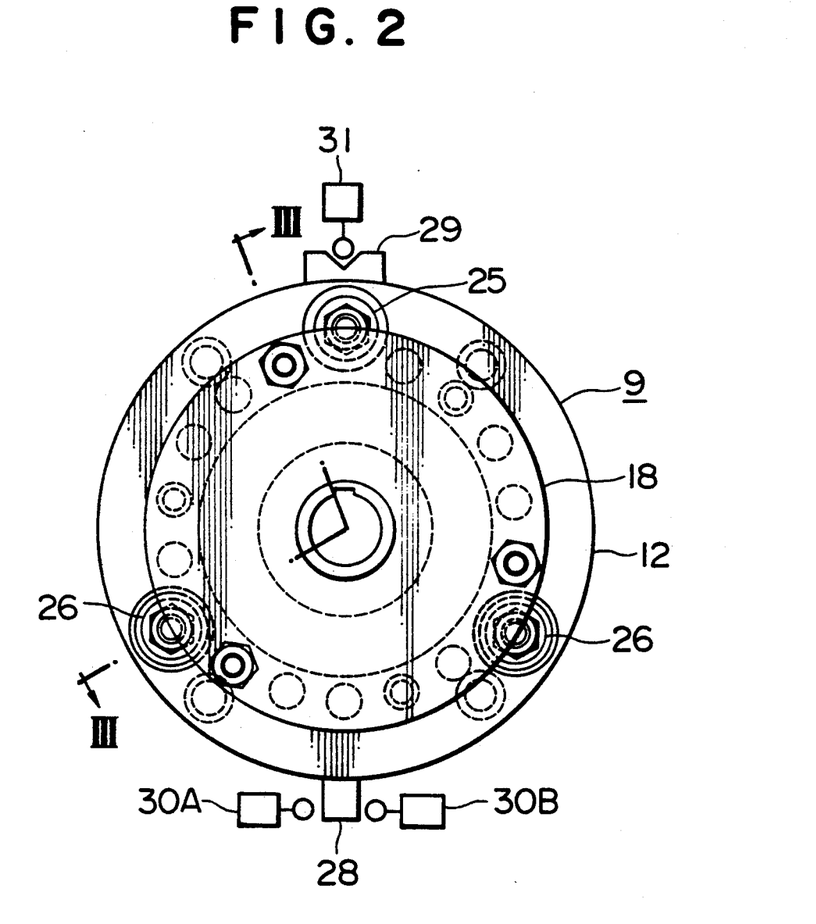
FIG. 2 is a front view showing an embodiment of the braking device for a winding machine for elevators, according to the present invention.
Figure 3:
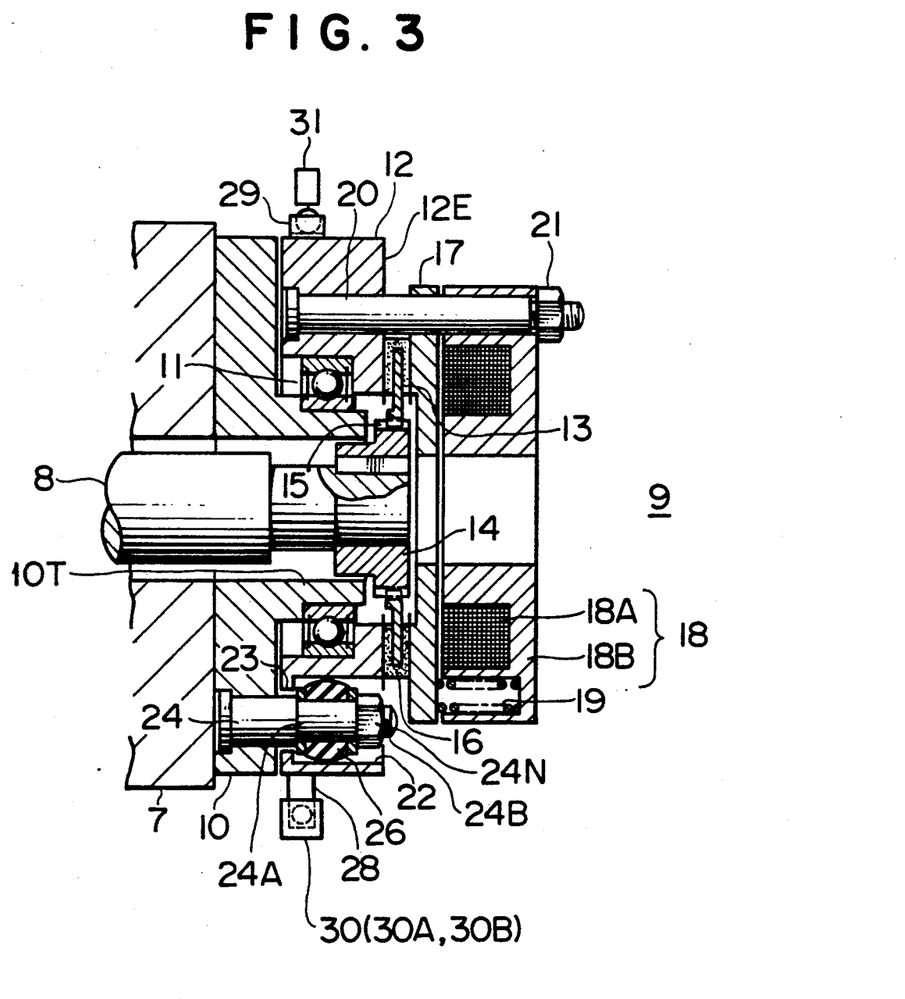
FIG. 3 is a sectional view taken along line III—III of FIG. 2.
Figure 4:
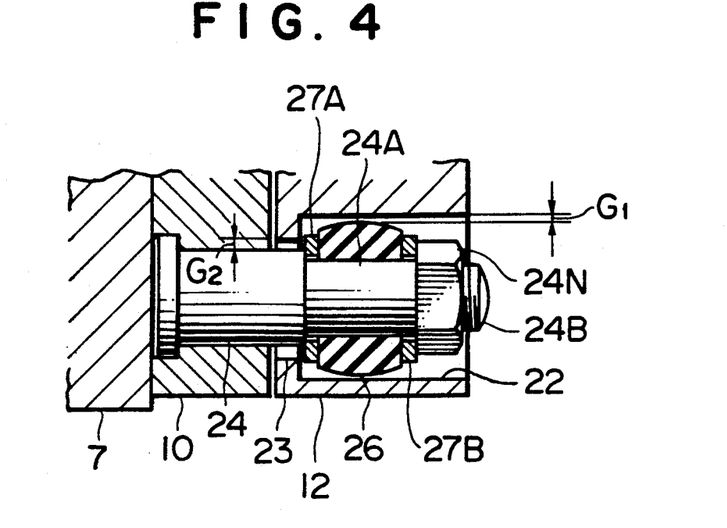
FIG. 4 is a partially enlarged view of FIG. 3.

Referring to FIGS. 1 through 4, an embodiment of this invention will be described. A rope or cable 3, to one end of which a car 1 is attached and to another end of which a balance weight 2 is attached, is held on a sheave 5 of a winding machine 4. The winding machine 4 has a drive motor 6, a reduction gear 7 and the sheave 5 mentioned above. A braking device 9 is connected to a rotary shaft 8 of the reduction gear 7. As shown in FIGS. 3 and 4, the braking device 9 has a base block 10 which is fixed to a housing of the reduction gear 7 and through which said rotary shaft 8 extends. This base block 10 has a cylindrical tube part 10T through which the rotary shaft extends and on which a first oscillating disc 12 forming a brake section is supported coaxially with said rotary shaft 8 through the intermediary of a bearing 11 located on an outer surface of the cylindrical tube part 10T. A rotary disc 13 is arranged adjacent to an axially outer end face 12E of The first oscillating disc 12 The disc 13 is fitted on a spline 15 formed around an outer periphery of a boss 14 fixed to the end of the rotary shaft 8 so that the disc 13 can move only in the axial direction, and has a lining 16 fixed to both sides thereof. A second oscillating disc 17 is arranged adjacent to an axially outer end surface of the disc 13 so that the disc 13 can be pressed against the first and second oscillating discs 12 and 17. The second oscillating disc 17 made of a magnetic material can be pulled away from the disc 13 by an electromagnet 18 including an electromagnetic coil 18A and a yoke 18B adjacent to each other and the disc 17 can be pressed against the disc 13 by a force of a braking spring 19 disposed between the disc 17 and the yoke 18B. The second oscillating disc 17 and the yoke 18B with the built-in electromagnetic coil 18A are supported on a guide pin 20 so that the second oscillating disc 17 is freely movable in the axial direction. One end of the guide pin 20 extends through the first oscillating disc 12 and engages therewith, and the other end extends through the yoke 18B and engages with a nut 21. By changing the fastened position of the nut 21, the distance between the first oscillating disc 12 and the second oscillating disc 17 can be adjusted.

The first oscillating disc 12 has a larger diameter than the oscillating disc 17 and has three holes, each of which includes a large-diameter engaging hole 22 and a small-diameter stopper hole 23, whose axes are identical with each other and extend parallel to the axis of the shaft 8. The stopper holes 23 open to the surface of the base block 10. Engaging pins 24 extend parallel to the axis of the shaft 8 from the end surface of the base block 10 into the engaging holes 22 of the first oscillating disc 12, respectively. Each of the engaging pins 24 has a small-diameter holding part 24A located in the engaging hole 22 and a small-diameter threaded part 24B at the end of the pin. As shown in FIG. 2, on the small-diameter holding part 24A of one of the engaging pins 24, a first rubber ring 25 is fitted and the outer diameter of the first rubber ring 25 is substantially equal to the inner diameter of the engaging hole 22. Seats 27A and 27B with diameters larger than that of the stopper hole 23 are also fitted on the small-diameter holding part 24A and the first rubber ring 25 is arranged between the seats 27A and 27B. On the small-diameter holding parts 24A of the other two engaging pins 24, second rubber rings 26 are fitted respectively and a clearance G1 is formed between the second rubber rings 26 and the engaging hole 22. The seats 27A and 27B with diameters larger than those of the stopper holes 23 are fitted on the small-diameter holding parts 24A and the second rubber ring 26 are arranged between the seats 27A and 27B, as shown in FIG. 4 in detail. Each of the three engaging pins 24 extends through the stopper hole 23 with a clearance G2 formed between the hole 23 and the engaging pin 24, and the clearance G1 between the second rubber rings 26 and the engaging holes 22 is smaller than the clearance G2. The threaded parts 24B of the engaging pins 24 engage with respective nuts 24N to prevent the first rubber ring 25 and the second rubber rings 26 from moving axially. The spring constant of the first rubber ring 25 is smaller than that of the rubber rings 26, and at first the first rubber ring 25 elastically supports the brake section (the first oscillating disc 12 and the second oscillating disc 17) and subsequently the second rubber rings 26 support elastically the brake section together with the first rubber ring 25.

In addition, the first oscillating disc 12 has a first protrusion 28 at a bottom thereof and a second protrusion 29 at a top thereof. The protrusion 28 is arranged between first microswitches 30 (30A and 30B) facing each other in the circumferential direction of the first oscillating disc 12 and a second microswitch 31 faces the second protrusion 29 in the circumferential direction of the first oscillating disc 12. The microswitches 30 and 31 are mounted on fixed member (not shown). Detection signals generated by the first and second microswitches 30 and 31 are fed back to a control unit 32 for controlling the operation of the drive motor 6. The two microswitches 30A and 30B of the first microswitch 30 are arranged on respective sides of the protrusion 28 in the rotating direction. When the first oscillating disc 12 is situated at a set position, that is, when the first rubber ring 25 is not deformed, the two microswitches 30A and 30B are located symmetrically with the protrusion 28. The single second microswitch 31 can engage the groove of the protrusion 29 in the rotating direction. The clearances between the microswitches and the protrusions 28 and 29 are suitable such that the microswitches 30A and 30B are actuated after the first rubber ring 25 has started to deform and the second microswitch 31 is actuated after the second rubber rings 26 have started to deform.

The operation of a braking device constructed as described is explained below. When the winding machine 4 is stopped, a power supply to the electromagnetic coil 18A is cut off, and the second oscillating disc 17 presses the disc 13 against the oscillating disc 12 with a pressing force of the braking spring 19. The pressing force applied to the second oscillating disc 17 stops the rotation of the disc 13, which engages the shaft 8, thereby keeping the sheave 5 stationary. If the weight of the elevator car 1 is equal to the weight of the balance weight 2 when the rotation of the sheave 5 is stopped by the brake device, the first rubber ring 25 is not deformed, and naturally, the first oscillating disc 12 does not rotate. Therefore, the first microswitches 30 are not actuated.

However, if the weight of the elevator 1 is not equal to the weight of the balance weight 2 as the passengers get on or off the car 1, an unbalance torque is applied to the sheave 5, thus causing the first oscillating disc 12 to rotate through the intermediary of the rotary shaft 8 and the disc 13, thereby deforming the first rubber ring 25. If the difference between the two weights is small, this difference can be supported by the first rubber ring 25 above. However, if the difference in weight is great, the first oscillating disc 12 rotates further and deforms the first rubber ring 25 further so that the clearances G1 between the second rubber rings 26 and the engaging holes 22 decrease to zero and the second rubber rings 26 start to deform. P1 in FIG. 5 indicates the point at which the second rubber rings 26 start to deform. If the rotation of the first oscillating disc 12 increases, the inner peripheries of the stopper holes 23 will eventually contact with the engaging pins 24 so that further rotation of the disc 12 is prevented. P2 in FIG. 5 indicates the point at which the stopper holes 23 contact with the engaging pins 24.

Figure 5:
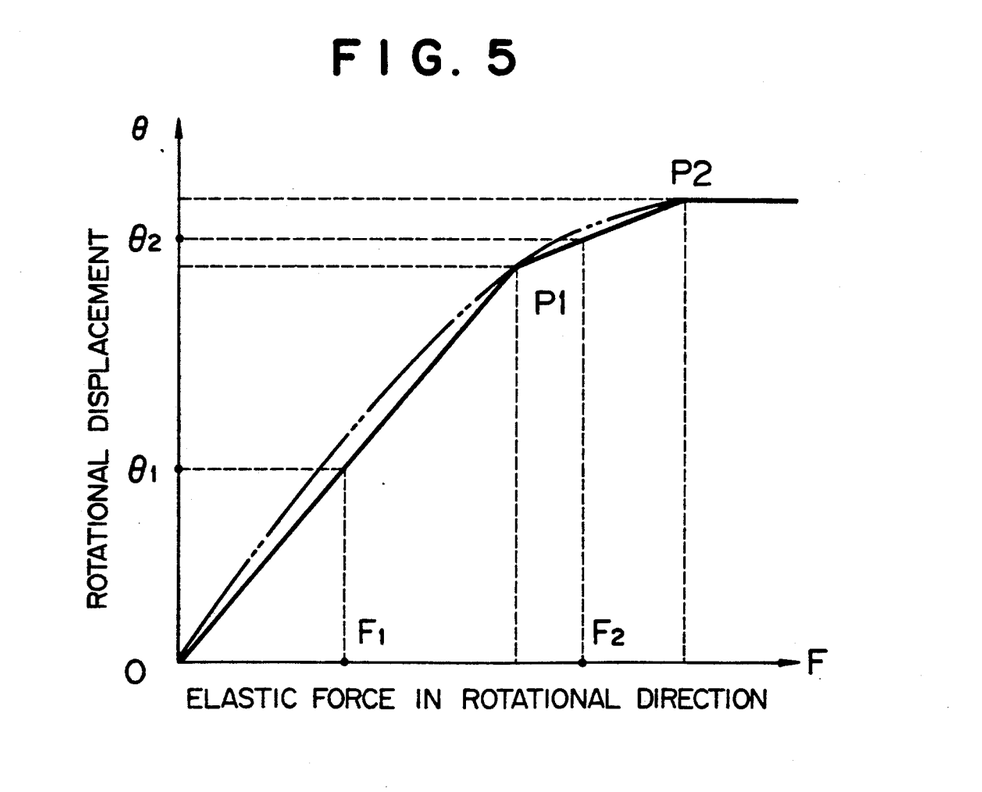
FIG. 5 is a characteristic diagram showing the relation between the rotational displacement and the elastic force in the braking device.

The microswitches 30 are actuated at the point G1 between the point 0 and the point P1 in FIG. 5. The second microswitch is actuated at the point $\theta 2$ between the point P1 and the point P2. The elastic forces F1 and F2 generated at the point $\theta 1$ and the point $\theta 2$ correspond to the braking torques.

Figure 6:
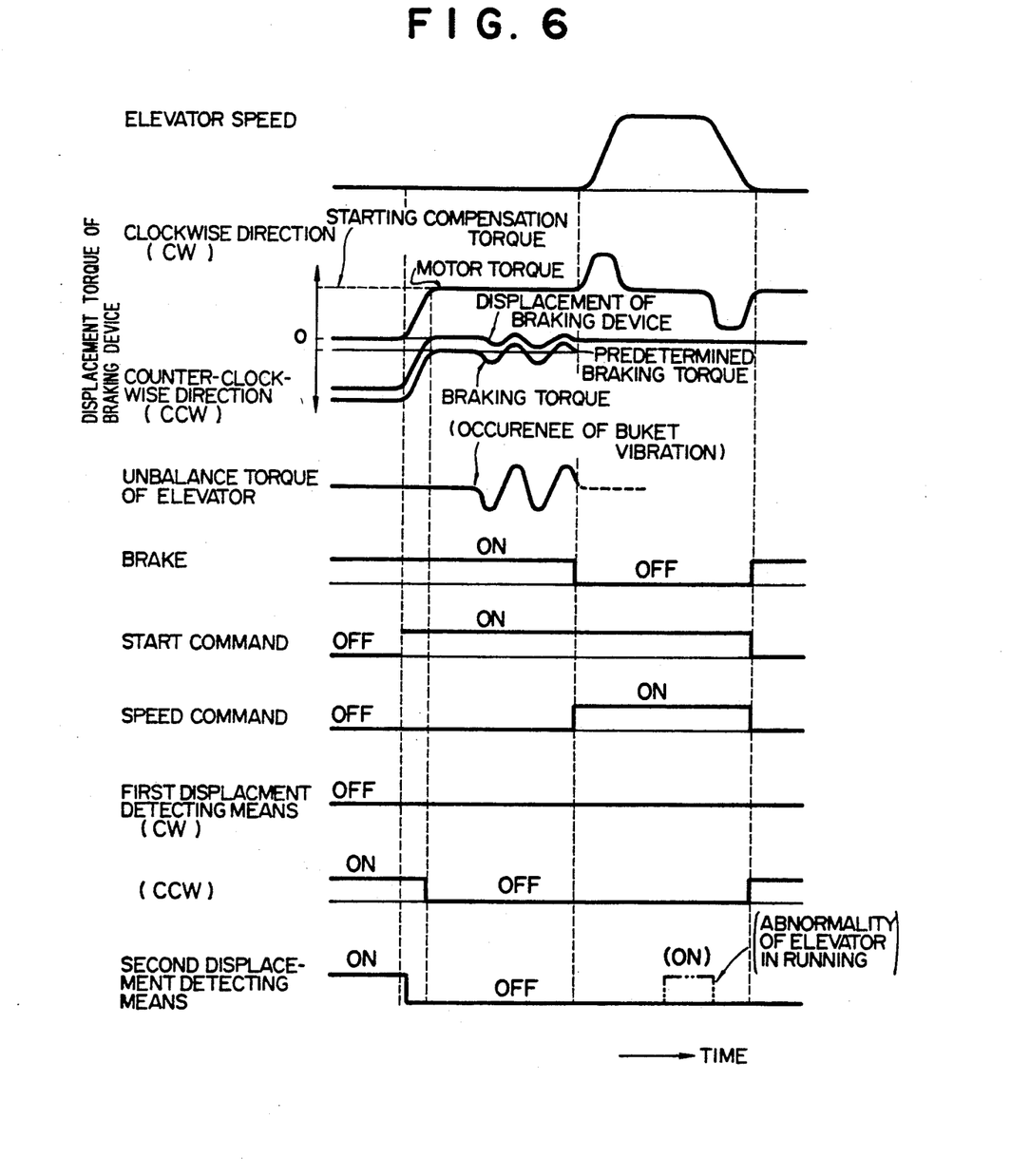
FIG. 6 is an operation chart showing the operating condition of the elevator of FIG. 1.

The relation between the elevator operating condition and the braking device with be explained below with reference to FIGS. 1 and 6.

If the elevator car 1 is stopped when it is heavier than the balance weight 2, a counterclockwise (CCW) torque is applied to the braking device 9 and the disc 12 is rotated so that the first rubber ring 25 is deformed and the first microswitch 30B is turned on. if, under this condition, an elevator start command is output, starting compensation is initiated by a control unit 32, and while the braking device 9 is actuated, the drive motor 6 generates a clockwise (CW) motor torque to decrease the braking torque. When the rotational displacement of the braking device 9 reaches $\theta 1$, as shown in FIG. 5, the microswitch 30 is turned off and the control unit 32 holds the degree of motor torque generated when $\theta 1$ has been reached if the rotational displacement becomes less than $\theta 1$. In addition a displacement detecting circuit of the first microswitches 30 is disconnected.

If, at this time, the elevator car 1 is vibrated by the passenger and the braking device 9 is oscillated so that the braking torque is changed, the first microswitches 30 (30A, 30B) are not actuated. Therefore, the drive motor 6 maintains the starting compensation torque at a fixed level.

When the balance weight 2 is heavier than the elevator car 1, an operation similar to the above mentioned operation is performed with the first microswitch 30A.

On the other hand, the second microswitch 31 is not used to generate a signal for starting compensation, but can be actuated while the car 1 is running. Furthermore, the second microswitch 31 generates an output signal only in response to an input signal which continues for a time longer than a predetermined length. If any abnormality occurs in the braking device 9, that is, if the second oscillating disc 17 and the guide pin 20 are stuck to each other or the second oscillating disc 17 is held in a half-attracted relation, with the electromagnet 18 through a foreign substance caught therebetween, for example, the microswitch 31 detects these abnormalities and the running elevator car 1 is stopped in accordance with the output signal of the microswitch 31. While the car is running, if the second oscillating disc 17 is only half-attracted to the electromagnet 18 and contacts the disc 13, the frictional force between the discs 13 and 17 forms a braking torque, so that the braking device 9 is rotationally displaced and the first rubber ring 25 and second rubber rings 26 are deformed.

This rotational displacement turns on the second microswitch 31, and according to this detection signal, the control unit 32 causes the drive motor 6 to stop. If the elevator car 1 is not stopped and is allowed to continue running while the second oscillating disc 17 contacts the disc 13, the lining 16 gets worn abnormally quickly, thus reducing the braking force and, according to circumstances, this makes the braking device unable to perform its function.

The first microswitches 30 are actuated through a deformation of the first rubber ring 25 which has a low spring constant. This provides a high detecting accuracy of the braking torque so that the small braking torque can be measured. Therefore, the starting compensation is controlled adequately to minimize any shock at the start of running.

When the braking device 9 is operated to stop the elevator car 1 under the loading condition that the unbalance torque is close to the maximum value, if only the first rubber ring 25 transmits the braking torque, this rubber ring 25 is deformed greatly so that the engaging pins 24 and the peripheries of the stopper holes 23 collide with each other and a shock is given to the passengers. As mentioned above, the second rubber rings 26 perform a buffer function, thereby avoiding the collision between the engaging pins 24 and the stopper holes 23 and preventing a shock to the passengers.

As is clear from the above description, according to this embodiment of the invention, it is possible to improve the detecting accuracy of the braking torque and prevent a shock from being given to the passengers when the elevator car is stopped.

Furthermore, according to the above-mentioned embodiment, it is possible to detect an abnormality of the braking device when the elevator car 1 descends or ascends and the reliability of the braking device 9 is increased. In this embodiment, the second microswitch 31 for detection of an abnormality of the braking device 9 detects an excessive displacement of the first oscillating disc 12 after the second rubber rings 26 are deformed. However, the second microswitch 31 may detect the excessive displacement of the first oscillating disc 12 caused by the deformation of the first rubber ring 25 alone.

In the above embodiment, the first rubber ring 25 having a small spring constant is fitted in the engaging hole 22 without any clearance, and the second rubber rings 26 having a large spring constant are fitted in the engaging holes 22 with clearances G1 respectively. However, the same effect can be obtained by using the same spring constant for both the first rubber ring 25 and the second rubber rings 26 and by employing the above-mentioned relations of clearance between the second rubber rings 26 and the engaging holes 22. That is, the spring constant can be varied nonlinearly by the first rubber ring 25 deformed at first and the second rubber rings 26 deformed subsequently with the first rubber ring 25. When the spring constant of first range is different from that of the second range greatly as shown by a two-dot chain line of FIG. 5, the same effects can be obtained, even if the spring constant varies continuously in the first range and the second range.

In the foregoing embodiment, microswitches are used as the first and second detecting means, but they may be replaced by detecting means using photo sensors or magnetic devices, for example. Moreover, the first displacement detecting means are provided in the vicinity of the first oscillating disc 12, but it is also possible to use a rotary encoder as the first displacement detecting means. The rotary encoder is mounted on the rotating-shaft of the drive motor 6 to measure the rotational displacement of the first oscillating disc 12.

In the foregoing embodiment, a disc type braking device is used. However, a drum type braking device which presses a brake shoe against a rotating drum in braking may be used as well.

Figure 1A:
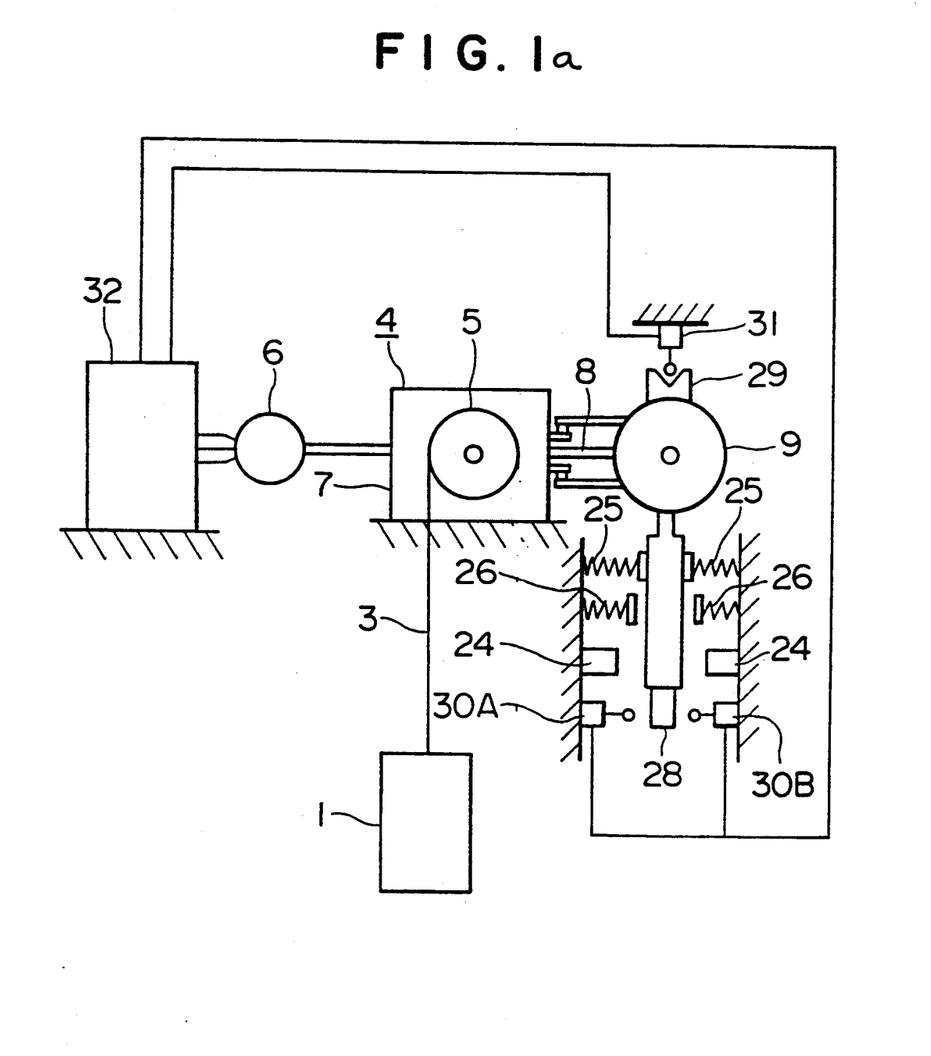
FIG. 1a is a schematic diagram of the same braking device as FIG. 1, but applied to an elevator in which the cable supports the elevator car is secured to the sheave of the winding machine.

In the foregoing embodiment, the winding machine has a sheave 5 to which the rope 3 is not fixed, but it is possible to use a winding drum type winding machine which moves the elevator car 1 up and down by winding up and down the rope fixed to the winding drum, as seen in FIG. 1a.

Figure 7:
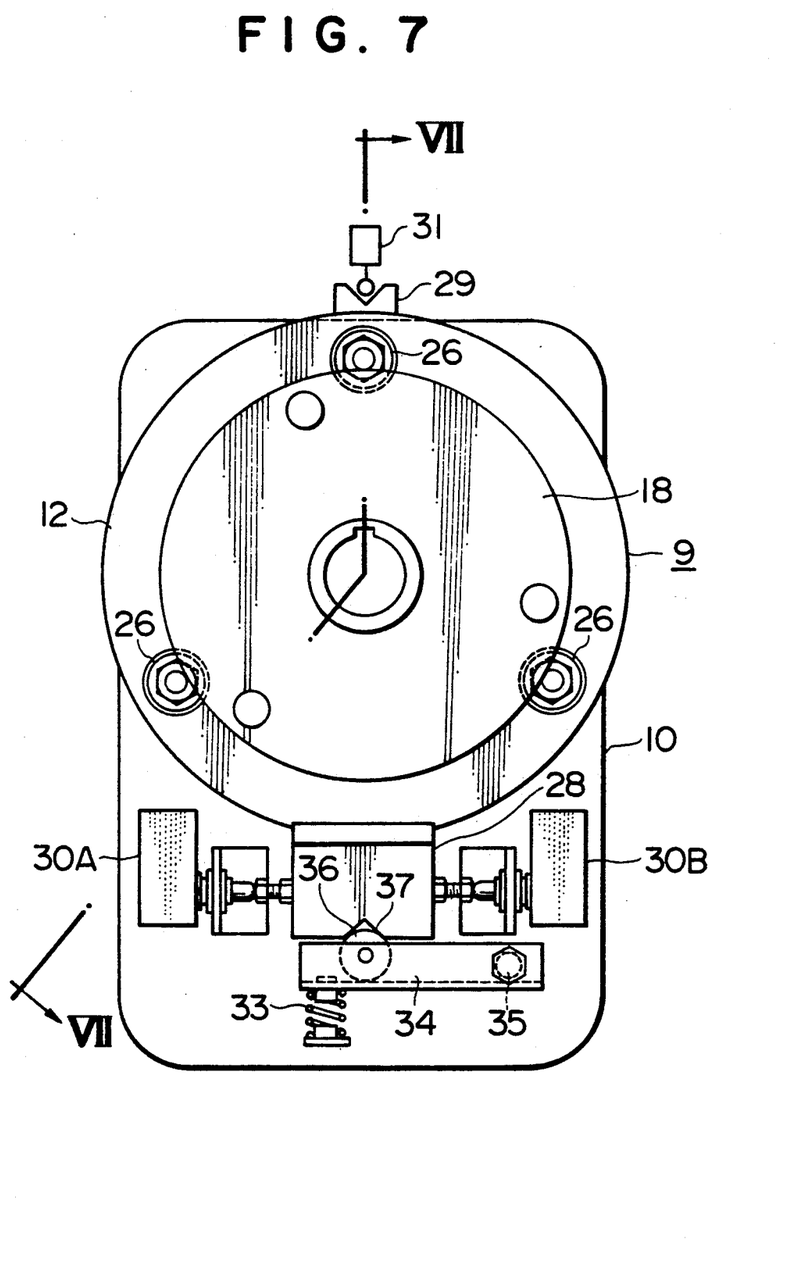
FIG. 7 is a front view of another embodiment of the braking device of a winding machine for elevators according to the present invention.
Figure 8:
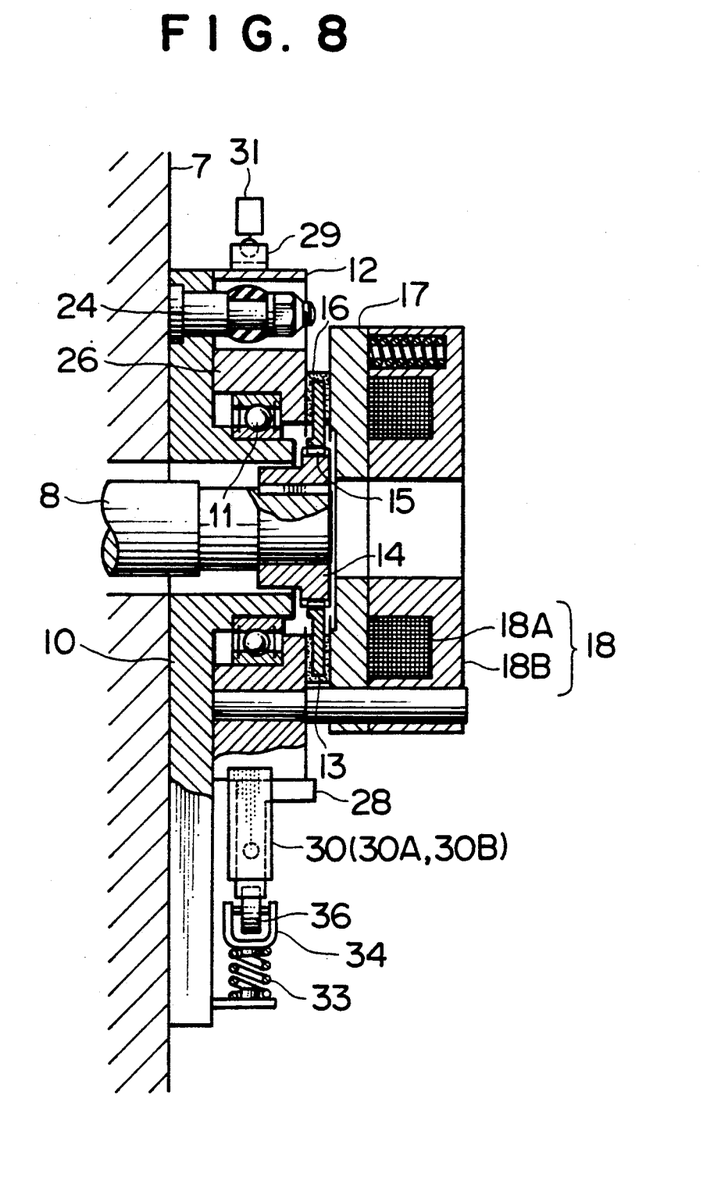
FIG. 8 is a sectional view taken along line VIII—VIII of FIG. 7.

Another embodiment of this invention is explained below with reference to FIGS. 7 and 8.

The braking device 9 is supported rotatably through a bearing 11 on a base block 10 fixed to a housing of a reduction gear 7. This braking device 9 comprises a first oscillating disc 12, a disc 13, a second oscillating disc 17, and an electromagnet 18. The relation between the first oscillating disc 12 and the base block 10 and the relation among the first oscillating disc 12, the second oscillating disc 17 and the electromagnet 18 is the same as in the embodiment of FIGS. 2 through 4. The differences from the foregoing embodiment are that a coil spring 33 is used as a member corresponding to the first rubber ring 25 of the foregoing embodiment, and that a support arm 34 supported by the coil spring 33 has a rotatably supported contact 36 thereon, which is engaged with a groove 37 of a protrusion 28 attached to the first oscillating disc 12. One end of the support arm 34 is supported through a bolt 35 on the base block 10.

In the construction described above, it is possible to provide an elastic force in a rotating direction according to the rotational displacement of the braking device 9 and obtain the same effect as in the foregoing embodiment.

As is clear from the above description, according to this invention, in a braking device of a winding machine for elevators, the brake section is supported on a fixed member through the intermediary of elastic bodies with a nonlinear characteristic including a first range of a small spring constant and a second range of a large spring constant, and a displacement detecting means detects a rotational displacement due to an unbalance torque which is applied to the brake section in the aforementioned first range when the winding machine is not operated. Therefore, it is possible to obtain an improved detecting accuracy of the unbalance torque during a stoppage of the winding machine so that the brake section is prevented from colliding against the stopper and a shock is not given to the passengers.

Since the displacement detecting means detects an excessive displacement of the brake section resulting from an abnormality of the braking device, for example, when the elevator car is moving up or down, the reliability of the braking device can be improved.

What is claimed is:

1. An elevator including a braking device comprising a support member supporting a braking member of said brake device such that said braking member is displaceable to a limited extent in the rotating direction thereof, wherein said support member has means for resisting rotational displacement of said braking member with a nonlinear characteristic including a first range where the amount of resistance to displacement is small and a second range where the amount of resistance to displacement is large.

2. An elevator including a braking device comprising a rotatable member, a braking member for applying a braking force to said rotatable member, and a support member elastically support said braking member with a nonlinear elastic characteristic such that said braking member is displaceable to a limited extent, wherein said nonlinear elastic characteristic has a first range where the spring constant is small and a second range where the spring constant is large in comparison to the spring constant of said first range.

3. An elevator including a braking device comprising a rotatable member, a braking member actuatable to apply a braking force to said rotatable member, and a support member supporting said braking member such that said braking member is displaceable to a limited extent by said rotatable member when actuated, wherein said support member is coupled to said braking member by elastic means having a nonlinear elastic characteristic including a first range of resistance to displacement of said braking member where the amount of displacement of said braking member in response to an applied force is large and a second range of resistance to displacement of said braking member where the amount of displacement of said braking member in response to an applied force is small.

4. The elevator according to any one of claims 1, 2 and 3, wherein said support member comprises a first elastic body providing said first range and a second elastic body providing said second range.

5. The elevator according to any one of claims 1, 2 and 3 wherein said support member includes a member made of rubber.

6. The elevator according to any one of claims 1, 2 and 3, wherein said support member is coupled to said braking member by a coil spring.

7. The elevator according to claim 4, wherein said first elastic body is deformed in said first range and both said first elastic body and said second elastic body are deformed in said second range.

8. An elevator including a braking device comprising a rotary body attached to a rotary shaft, a brake section engageable with said rotary body to apply a braking force thereto and a support member for supporting said brake section so that it is displaceable to a limited extent in the rotating direction of said rotary body through the intermediary of an elastic body, wherein said elastic body has a nonlinear elastic characteristic.

9. The elevator according to claim 8, wherein said rotary body is a rotary disc displaceable in the axial direction, wherein said brake section includes a first oscillating disc and a second oscillating disc which are disposed on respective sides of said rotary disc, and wherein one of said first oscillating disc and said support member has an axially-protruding part and the other has a hollowed part and said elastic body is interposed between the protruding part and the hollowed part.

10. The elevator according to claim 9, wherein a plurality of sets of said protruding parts and said hollowed parts are arranged on a line of circle, said protruding parts support said elastic bodies whose diameters are identical with each other and whose elastic characteristics are identical with each other, some of said plurality of sets have large clearances and the other of said plurality of sets have small clearances in the direction of rotational displacement between said elastic bodies and said hollowed parts.

11. An elevator comprising a braking device including elastic means, a rotary body driven by the force of a rotary shaft of a winding machine, a brake section which generates and cuts off a braking force by coming into contact with and separating from said rotary body means for supporting said brake section on a fixed member through the intermediary of said elastic means in order to detect a rotational displacement due to an unbalance torque applied to said brake section when said winding machine is stopped, wherein said elastic means has a nonlinear characteristic including a first range of a small constant and a second range of a spring constant higher than said first range, and wherein a range for detecting said rotational displacement in said first range.

12. An elevator comprising a braking device including elastic means, a rotary body driven by the force of a rotary shaft of a winding machine, a brake section which generates and cuts off a braking force by coming into contact with and separating from said rotary body, said braking device supporting said brake section on a fixed member through the intermediary of said elastic means in order to detect a rotational displacement due to an unbalance torque applied to said brake section when said winding machine is stopped, wherein said elastic means has a nonlinear elastic characteristic including a first range where the amount of displacement of said brake section in response to the applied force is large and a second range where the amount of displacement of said brake section in response to the applied force is smaller than in said first section, and wherein a range for detecting said rotational displacement is said first range.

13. An elevator comprising elastic means and a braking device which generates and cuts off a braking force by bringing a brake section into contact with and separating it from a rotary body driven by the force of a rotary shaft of a winding machine, wherein said brake section is supported on a fixed member through the intermediary of said elastic means having a nonlinear elastic characteristic including a first range where the spring constant is small and a second range where the spring constant is large first displacement detecting means for detecting a rotational displacement due to an unbalance torque applied to said brake section in said first range when the winding machine is stopped, and second displacement detecting means for detecting a rotational displacement due to a torque applied to said brake section in said second range when the winding machine is operating.

14. The elevator according to claim 13, wherein said winding machine includes a sheave for moving a cable to one end of which an elevator car is attached and to another end of which a balance weight is attached, and wherein the cable is not fixed to the sheave but engages with the sheave.

15. The elevator according to claim 13, wherein said winding machine includes a winding drum for winding up and down a cable to one end of which an elevator car is attached, and wherein the cable is fixed to the sheave.

16. The elevator according to claim 13, wherein said winding machine includes a protruding rotary shaft, a base block through which said rotary shaft extends, a first oscillating disc which is supported on said base block through the intermediary of a bearing and whose axis is identical with the axis of the shaft, a second oscillating disc which is supported on said first oscillating disc and which is pressed against said first oscillating disc by a spring and is separated from said first oscillating disc by the force of an electromagnet, and an axially-movable disc which is supported on said rotary shaft at the outside of the base bock and which is located between said first and second oscillating discs, said base block has a plurality of engaging pins protruding on the side of said first oscillating disc, said first oscillating disc has engaging hole which engage with said engaging pins, and said elastic means are supported by said engaging pins in the engaging holes.

17. The elevator according to claim 13, wherein said first displacement detecting means is an encoder.

18. The elevator according to claim 17, wherein said encoder is mounted on a motor shaft of said winding machine drive motor.

19. The elevator according to claim 16, wherein said engaging holes of said first oscillating disc include small-diameter holes on the side through which said engaging pins are inserted and large-diameter holes whose diameters are larger than said small-diameter holes.

20. The elevator according to claim 19, wherein the clearance between said engaging pins and said small diameter holes are larger than the clearance between said elastic means and said engaging holes.

21. A braking device for an elevator winding machine, comprising a fixed member, a rotatable member, braking means for applying a braking force to the rotatable member, and elastic means arranged between the fixed member and said braking means and having a nonlinear elastic characteristic so that said braking means is supported on said fixed member with an elastic displacement therebetween which is nonlinear with respect to forces applied to said braking means by said rotatable member when said braking means is actuated.

22. The braking device of an elevator winding machine, according to claim 21, wherein the rotatable member is displaceable in the axial direction, the braking means includes a first oscillating disc and a second oscillating disc which are disposed on respective sides of the rotatable member, and one of said first oscillating disc and the fixed member has an axially-protruding part and the other has a hollowed part and said elastic means are interposed between the protruding part and the hollowed part.

23. The braking device for an elevator winding machine according to claim 22, wherein a plurality of sets of said protruding parts and said hollowed parts are arranged on a line of circle, said protruding parts support said elastic means whose diameters are identical with each other and whose characteristics are identical with each other, some of said plurality of sets have large clearances and the other of said plurality of sets have small clearances in the direction of rotational displacement between said elastic means and said hollowed parts.

* * * * *